United States Patent
Klocker

(10) Patent No.: US 11,864,693 B1
(45) Date of Patent: Jan. 9, 2024

(54) BLENDER BLADE FORMED OF TITANIUM OR TITANIUM ALLOY

(71) Applicant: All Metal Sales, Inc., Westlake, OH (US)

(72) Inventor: Thomas G. Klocker, Lakewood, OH (US)

(73) Assignee: All Metal Sales, Inc., Westlake, OH (US)

( * ) Notice: Subject to any disclaimer, the term of this patent is extended or adjusted under 35 U.S.C. 154(b) by 90 days.

(21) Appl. No.: 17/181,094

(22) Filed: Feb. 22, 2021

Related U.S. Application Data

(63) Continuation of application No. 14/685,567, filed on Apr. 13, 2015, now Pat. No. 10,925,438.

(60) Provisional application No. 61/978,990, filed on Apr. 14, 2014.

(51) Int. Cl.
| | |
|---|---|
| *A47J 43/00* | (2006.01) |
| *A47J 43/07* | (2006.01) |
| *C23C 8/02* | (2006.01) |
| *C23C 8/24* | (2006.01) |
| *B23P 15/28* | (2006.01) |

(52) U.S. Cl.
CPC ........... *A47J 43/0722* (2013.01); *B23P 15/28* (2013.01); *C23C 8/02* (2013.01); *C23C 8/24* (2013.01)

(58) Field of Classification Search
CPC .......... A47J 43/0722; C23C 8/02; C23C 8/24; B23P 15/28
See application file for complete search history.

(56) References Cited

U.S. PATENT DOCUMENTS

| | | | |
|---|---|---|---|
| 2,243,666 A | 5/1941 | Beckner | |
| 2,788,038 A | 4/1957 | Corcoran | |
| D181,373 S | 11/1957 | Schmidt | |
| 3,147,958 A | 9/1964 | Stiffler | |
| 4,846,413 A | 7/1989 | Inoue | |
| 5,172,748 A | 12/1992 | Satmer | |
| 5,320,014 A * | 6/1994 | Skaar | B26D 7/0625 |
| | | | 83/676 |
| 5,647,546 A | 7/1997 | Sinovas et al. | |
| 6,092,922 A | 7/2000 | Kett et al. | |
| D433,282 S | 11/2000 | Bohannon, Jr. et al. | |
| 6,270,831 B2 * | 8/2001 | Kumar | C23C 14/0641 |
| | | | 427/127 |

(Continued)

FOREIGN PATENT DOCUMENTS

| | | | | |
|---|---|---|---|---|
| JP | 06343562 | * | 4/1993 | ............. A47J 43/07 |

OTHER PUBLICATIONS

"Restriction Requirement for U.S. Appl. No. 14/685,567", dated Jun. 19, 2017, 5 Pages.

(Continued)

*Primary Examiner* — Faye Francis
(74) *Attorney, Agent, or Firm* — Calfee, Halter & Griswold LLP

(57) ABSTRACT

A blender blade formed of titanium or titanium alloy is described herein. The blender blade comprises a central portion and one or more blade wings extending therefrom. Each blade wing comprises a leading edge, wherein the leading edge is work hardened to cause the leading edge to have a first hardness which is harder than a second hardness of the central portion. The central portion is in an annealed condition. The first hardness is in a range of about 40-50 HRC, the second hardness is in a range of about 20-30 HRC. Subsequent to work hardening, the leading edge can undergo nitriding and/or layer deposition.

20 Claims, 7 Drawing Sheets

(56) References Cited

U.S. PATENT DOCUMENTS

| | | |
|---|---|---|
| 6,402,070 B1 | 6/2002 | Ishida et al. |
| 6,550,703 B2 | 4/2003 | Williams et al. |
| 6,662,529 B2 | 12/2003 | Grano |
| 7,159,806 B1 | 1/2007 | Ritsema |
| 7,278,598 B2 | 10/2007 | Katz et al. |
| 7,552,885 B2 | 6/2009 | Katz et al. |
| 8,132,752 B1 | 3/2012 | Hotaling et al. |
| 8,740,120 B2 | 6/2014 | Paturel |
| 9,475,059 B2 | 10/2016 | Vallen et al. |
| 9,750,373 B2 | 9/2017 | Gherman et al. |
| 2002/0139884 A1 | 10/2002 | Williams et al. |
| 2008/0028951 A1 | 12/2008 | Margaret |
| 2010/0300304 A1 | 12/2010 | Shimizu |
| 2014/0299702 A1 | 10/2014 | Kroell et al. |
| 2015/0237910 A1 | 8/2015 | Watanabe |

OTHER PUBLICATIONS

"Reply to Restriction Requirement for U.S. Appl. No. 14/685,567", Filed Date: Aug. 16, 2017, 5 Pages.

"Non-Final Office Action for U.S. Appl. No. 14/685,567", dated Sep. 26, 2017, 7 Pages.

"Reply to Non-Final Office Action for U.S. Appl. No. 14/685,567", Filed Date: Mar. 23, 2018, 11 Pages.

"Final Office Action for U.S. Appl. No. 14/685,567", dated Jun. 5, 2018, 8 Pages.

"Notice of Appeal for U.S. Appl. No. 14/685,567", Filed Date: Sep. 4, 2018, 2 Pages.

"Appeal Brief for U.S. Appl. No. 14/685,567", Filed Date: Nov. 5, 2018, 21 Pages.

"Examiner's Answer to Appeal Brief for U.S. Appl. No. 14/685,567", dated Dec. 27, 2018, 9 Pages.

"Reply Brief for U.S. Appl. No. 14/685,567", Filed Date: Feb. 27, 2019, 8 Pages.

"Patent Board Decision for U.S. Appl. No. 14/685,567", dated Aug. 3, 2020, 14 Pages.

"Reply to Patent Board Decision for U.S. Appl. No. 14/685,567", Filed Date: Oct. 5, 2020, 11 Pages.

"Notice of Allowance and Fees Due for U.S. Appl. No. 14/685,567", dated Oct. 21, 2020, 8 Pages.

\* cited by examiner (Section A-A)

(section c-c)

(section B-B)

BLENDER BLADE FORMED OF TITANIUM OR TITANIUM ALLOY

RELATED APPLICATION

This application is a continuation of U.S. patent application Ser. No. 14/685,567 ("the '567 application"), filed on Apr. 13, 2015, and entitled "BLENDER BLADE FORMED OF TITANIUM OR TITANIUM ALLOY", the entirety of which is incorporated herein by reference. The '567 application claims priority to U.S. Provisional Patent Application No. 61/978,990, filed on Apr. 14, 2014, and entitled "BLENDER BLADE FORMED OF TITANIUM OR ALLOYED TITANIUM", the entirety of which is incorporated herein by reference.

BACKGROUND

Beverages and other food items made through use of blending apparatuses (blenders) are becoming increasingly popular. For instance, beverages commonly referred to as "smoothies" are becoming increasingly popular, due to perceived health attributes of such beverages. Smoothies often include fruit, vegetables, and other unprocessed items.

Conventional blenders include blades that are composed of stainless steel. A recent trend in the use of blenders is to cause the temperature of a region proximate to the blade in the blender to be relatively low—on the order of −50 degrees Fahrenheit. Stainless steel blades, however, have been found to break when operated at such temperatures. Furthermore, conventional stainless steel blades include nickel, which is undesirable.

SUMMARY

The following is a brief summary of subject matter that is described in greater detail herein. This summary is not intended to be limiting as to the scope of the claims.

Described herein are various technologies pertaining to various blade configurations for use in a blending apparatus (blender). In an exemplary embodiment, the blade can include a planar body portion and one or more blade wings that extend from the body portion, although the aspects described herein are not so limited. The body portion can include an aperture that extends therethrough, wherein the blade can be positioned in the blender such that a rotatable shaft is secured to the blade via the aperture. For instance, the shaft can include a threaded end that extends through the aperture, and a correspondingly threaded nut can be employed to secure blade with the rotatable shaft.

In an exemplary embodiment, at least one of the blade wings can be angularly offset from the body portion (e.g., such that when the body portion defines an X-Y plane, at least one blade wing extends in the positive or negative Z direction). In another exemplary embodiment, a first blade wing can be angularly offset from the body portion in a first direction, while a second blade wing can be angularly offset from the body portion in a second direction. In yet another example, at least one blade wing can be coplanar with the body portion. Further, an exemplary blade described herein can be included in a blade assembly that comprises multiple blades, wherein the blades are secured to one another to form the blade assembly.

The blade can be composed (e.g., entirely) of titanium or titanium alloy. For instance, the blade can be formed from commercially pure, unalloyed, titanium (e.g., any of grade 1, 2, 3, 4). The blade can also be formed from titanium alloy, such as grade 5 titanium.

In an embodiment, the blade can initially be in the form of a blank stamped from a sheet of material, wherein the blank is in an annealed condition and has a first hardness (e.g., about 25 HRC). The leading edges of the respective blade wings can be hardened, such that the leading edges have a second hardness, the second hardness being harder than the first hardness. The second hardness can be about 45 HRC.

Hardening can be by any suitable process, such as work hardening (e.g., coining) of material comprising the leading edge material, nitriding the leading edge material, forming a layer over the leading edge material by depositing a material over the leading edge material. Further, the leading edge material can undergo work hardening, wherein the work hardened material is subsequently nitrided and/or has a layer deposited thereon.

Subsequent to hardening the blade can undergo further processing such as final machining, as well as electropolishing.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
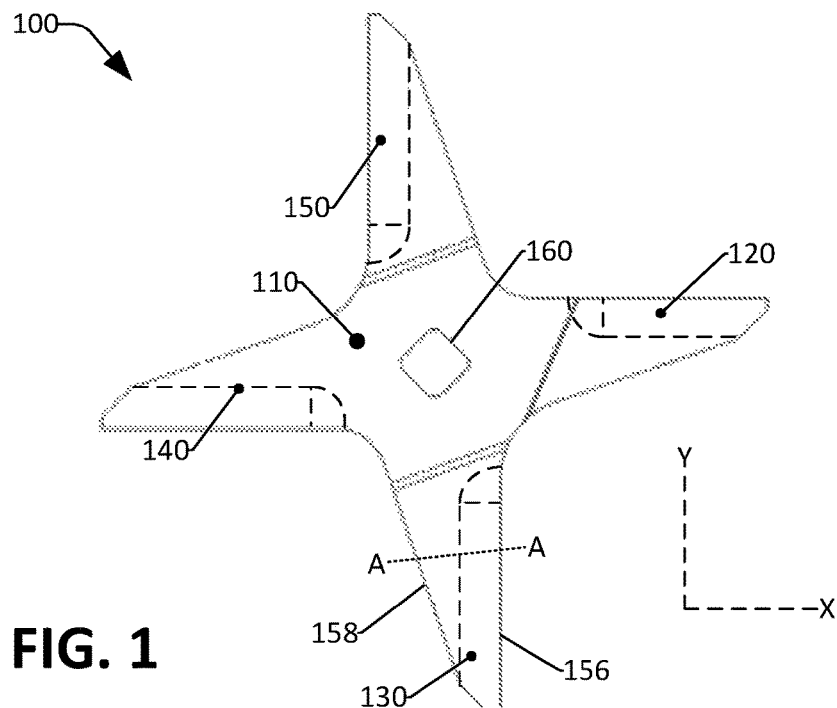
FIGS. 1 and 2 are exemplary drawings of a blade configuration comprising four blade wings.

Various technologies pertaining to a blade that is well-suited for use in a blender apparatus (blender) are now described with reference to the drawings, wherein like reference numerals are used to refer to like elements throughout. In the following description, for purposes of explanation, numerous specific details are set forth in order to provide a thorough understanding of one or more aspects.

It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

With reference collectively to FIGS. 1, 2, and 10-17, a plurality of exemplary blender blade configurations for application in a blender apparatus are presented. It is to be understood that the blades shown in the FIGS. 1, 2, and 10-17 are presented as example configurations, and blades that have different configurations (structure, design) are intended to fall under the scope of the hereto-appended claims.

Figure 2:
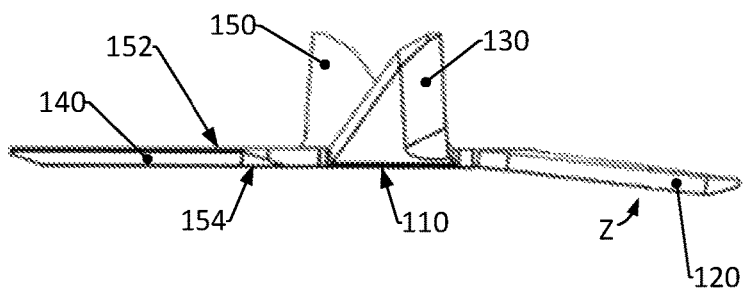

An exemplary blade configuration 100 presented in FIGS. 1 and 2 includes a planar body portion 110 that is centrally positioned on the blade 100. The blade configuration 100 also comprises four blade wings, 120, 130, 140 and 150, that respectively extend from the planar body portion 110. It is to be appreciated that while the blade 100 comprises four blade wings, a blender blade configuration may include fewer blade wings (e.g., 1-3 blade wings, inclusive) or more blade wings (e.g., 5 or more blade wings, inclusive).

The blade 100 can be fabricated from a single piece of material, e.g., a planar piece (a blank) of material stamped from sheet stock, wherein, after being stamped the blank can undergo subsequent forming (e.g., bending) to produce a desired shape. The blade 100 can also be formed by any suitable fabrication technique, such as casting, near net-shape forming, machining (e.g., milling), etc.

Figure 3:
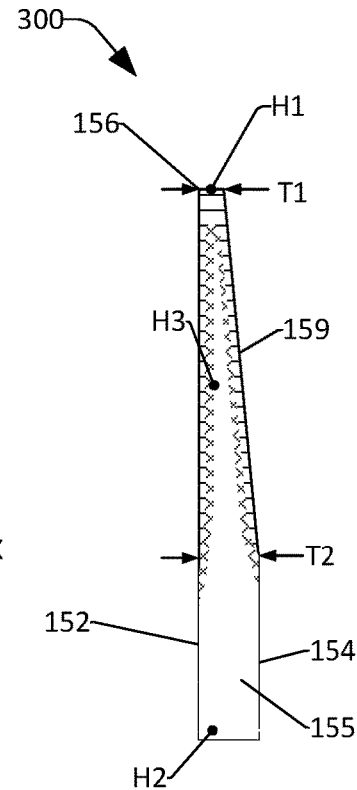
FIG. 3 is an exemplary schematic of a hardened leading edge of a blade wing.

Hence, as further shown in FIGS. 1 and 2 in conjunction with FIG. 3, configuration 300 (on section A-A of FIG. 1), the body portion 110 and the blade wings 120-150 can have a common upper surface 152, and a common lower surface 154. Furthermore, each blade wing 120-150 can have a leading edge surface 156 and a trailing edge surface 158 respectively located between the upper surface 152 and lower surface 154 of each blade wing 120-150.

During operation of a blender apparatus (not shown), the leading edge 156 will act to slice (cut, separate) any medium (e.g., foodstuff) in the blender that is to be "blended". Depending upon a particular design of a blade 100, a thickness, T1, of the blade wings at the respective leading edges 156 can be less than a thickness, T2, of the blade wings at the respective trailing edges 158. The thickness of a blade wing can taper from a thickness T2 to a thickness T1 at the leading edge 156, e.g., as a function of a beveled surface 159 between the lower surface 154 and the leading edge 156. As shown in FIG. 3, the leading edge 156 can be blunt, while in another embodiment (not shown), one of more beveled surfaces 159 can be utilized on each upper surface and lower surface of a blade wing to form a knife edge at the leading edge 156.

The planar body portion 110 includes an aperture 160 that extends therethrough between the upper surface 152 and the lower surface 154. A rotatable shaft of a blender apparatus (not shown) can have a threaded portion (e.g., a threaded end) that extends through the aperture 160, and a fastener (e.g., a nut) can be utilized to secure the blade 100 to the rotatable shaft. As illustrated, for example, in FIG. 1, the shaft can rotate the blade 100 in a particular direction (e.g., counter-clockwise when viewing the blade 100 shown in FIG. 1), wherein the aperture 160 can have a shape to enable keying of the blade 100 onto the rotatable shaft.

Further, as illustrated in FIG. 1 in conjunction with FIG. 3, configuration 300, at least one blade wing 120-150 of the blade 100 can be angularly offset from the planar body portion 110 of the blade 100. For example, the planar body portion 110 can be aligned in an X-Y plane, and at least one blade wing 120-150 can be aligned in a respective positive or negative Z-direction. In an exemplary embodiment, per FIGS. 1 and 3, a first blade wing 130 (or 150) can be angularly offset in the positive Z-direction, and a second blade wing 120 can be angularly offset in the negative Z-direction. In another exemplary embodiment, two blade wings, e.g., blade wings 130 and 150, can be angularly offset in the positive Z-direction, while another blade wing 120 can be angularly offset in the negative Z-direction. Still further, at least one blade wing, e.g., blade wing 140, can be coplanar with the planar body portion 110 of the blade 100.

As previously described, during low temperature operation of a blender (e.g., at about −30° F. to about −50° F.) a blade fabricated with steel, stainless steel, etc., may be prone to cracking and/or failure, e.g., as a function of the blade operating at a temperature where the steel is too brittle (e.g., low ductility, toughness). Accordingly, to facilitate operation of the blender at low temperatures, the blade 100 is fabricated from a material having a toughness that can withstand operation (e.g., impaction by the material being blended) at the lower temperatures. A suitable material is titanium or a titanium alloy. A number of alloying elements can be added to titanium such as aluminum, vanadium, zirconium, etc., as well as other elements such as carbon, nitrogen, oxygen, hydrogen, iron being presents in various amounts (e.g., as trace elements) to form various respective compositions which can be assigned a 'grade' based upon respective standards, e.g., American Society of Metals (ASM) International. Other chemical characterizations are also provided internationally by such institutes as the British Standards Institution (BSI), Association Francaise de Normalisation (AFN), Werkstoffhandbuch der Deutschen Luftfahrt (WDL), etc.

Any suitable composition of titanium and/or titanium alloy can be utilized to form the blade 100, e.g., grade 1 titanium, grade 2 titanium, grade 4 titanium, grade 5 titanium alloy, etc. In still further examples, the blade 100 can be formed of a titanium alloy that includes between about 51% and about 60% titanium, between about 61% and about 70% titanium, between about 71% and about 80% titanium, between about 81% and about 90% titanium, or between about 91% and about 99% titanium. The titanium and/or titanium alloy can contain 0% to minimal % nickel to enable application of the blade 100 with foodstuffs or other materials where nickel can be injurious to health.

The titanium alloy selected can have a particular toughness to enable operation of the blender at the desired temperature, e.g., a temperature in a range of about −50° F. to about 100° F. (about −46° C. to about 37° C.). It is to be appreciated that while the temperature range of about −50° F. to about 100° F. is presented, any suitable range can be utilized for operation of the blender as applicable with the titanium and/or titanium alloy composition selected. For example, a temperature lower than about −50° F., a temperature greater than about 100° F., etc. To aid readability, the term titanium is used hereafter, and can refer to both a titanium alloy that is commercially pure (e.g., grade 2 titanium) and also a titanium alloy.

To facilitate operation of the blade 100 at a desired temperature(s), and with one or more mediums to be blended in the blender, the blade 100 can be processed to have a first hardness at the leading edge 156 that is different to (e.g., harder than) a second hardness at the planar body portion 110. For example, as shown in FIG. 3, a hardness, H1, at the leading edge 156 can be harder than a hardness H2 at the planar body portion 110, and in a central region 155 of a blade 100, with the hardness H1 transitioning to hardness H2 with one or more intermediary hardness values H3. The depth of hardness H1 can be controlled to facilitate the surface of leading edge 156 (and portion of upper surface 152, a portion of lower surface 154, and/or a portion of beveled surface 159) having a desired hardness. However, while a surface (e.g., surfaces 152, 154, 159) can be hardened, e.g., via work hardening, the hardening mechanism can result in the surface having a higher degree of brittleness (e.g., less ductile or less tough) than the softer, more ductile material comprising the central region 155 of the blade 100 and further material comprising the planar body portion 110.

In an exemplary fabrication process to form the blade 100, the desired shape can be stamped (e.g., as a blank) out of a rolled strip of titanium alloy, wherein the blank has a hardness H2 (e.g., a hardness of a processed annealed state). The respective leading edges 156 of the respective blade wings 120-150 can undergo hardening to a hardness of H1, and the blade wings 120-150 can undergo subsequent bending to achieve desired alignment of the respective blade wings 120-150 (as previously described). In another embodiment, the blade wings 120-150 can be bent prior to hardening.

The hardness H1 can be achieved by any suitable process, e.g., such as a work hardening operation (e.g., coining, deformation hardening, etc.), a surface modification process (e.g., nitriding, diffusion, etc.), or application of a hardened layer (e.g., surface deposition, plasma coating, etc.) upon any of the upper surface 152, the lower surface 154, the leading edge 156, and the beveled surface 159, etc., or portion(s) thereof.

Pursuant to an example, the blade 100 can have an approximately uniform hardness throughout its cross-section (e.g., hardness H2 throughout). For instance, the hardness can be between Hardness Rockwell Scale C (HRC) 25 and HRC 80. With more particularity, the hardness can be between about HRC 30 and about HRC 35, can between about HRC 36 and about HRC 40, can be between about HRC 41 and about HRC 45, can be between about HRC 46 and about HRC 50, can be between about HRC 51 and about HRC 55, can be between about HRC 56 and about HRC 60, can be between about HRC 61 and about HRC 65, can be between about HRC 66 and about HRC 70, can be between about HRC 71 and about HRC 75, or can be between about HRC 76 and about HRC 80. As used herein, the term "about" is intended to encompass the value modified by such term as well as 10% differences in such value. Thus, "about 80" is to encompass between 72 and 88.

As previously mentioned, subsequent to fabrication, the blade 100 can have varying hardness throughout the blade 100. For example, the body portion 110 of the blender blade can have a first hardness, H2, while the blade wings 120-150 of the blender blade can have a second hardness, H1, where H1>H2 or H1<H2. In a non-limiting example, hardness H2 can be between about HRC 20 and about HRC 30, while H1 can be a hardness of about 40 HRC to about 50 HRC. In another example, H2 can be a hardness of between about HRC 30 and about HRC 35, while H1 can be a hardness of between about HRC 40 and about HRC 50. In a further example, H2 can be an hardness of about HRC 40 and about HRC 50, while H1 can be between about HRC 60 and HRC 70.

In another embodiment, H2 can have a hardness of about HRC 25 while H1 can have a hardness of about HRC 45. By engendering a lower hardness (e.g., H2) at the body portion 110, material toughness can be retained at the body portion 110 while a higher hardness (e.g., H1) and a corresponding brittle surface is only imparted at the leading edge surfaces (e.g., any of surfaces 152, 154, 156, and/or 159). Such an approach can lead to an increased life of blade 100 and accordingly, mitigate failure of the blade 100 when compared with a lifetime/failure mechanism of a conventional blade formed from steel, stainless steel, etc. Other hardness ranges for respective the respective hardnesses H1, H2, and H3, will be readily contemplated by one skilled in the art.

Figure 4:
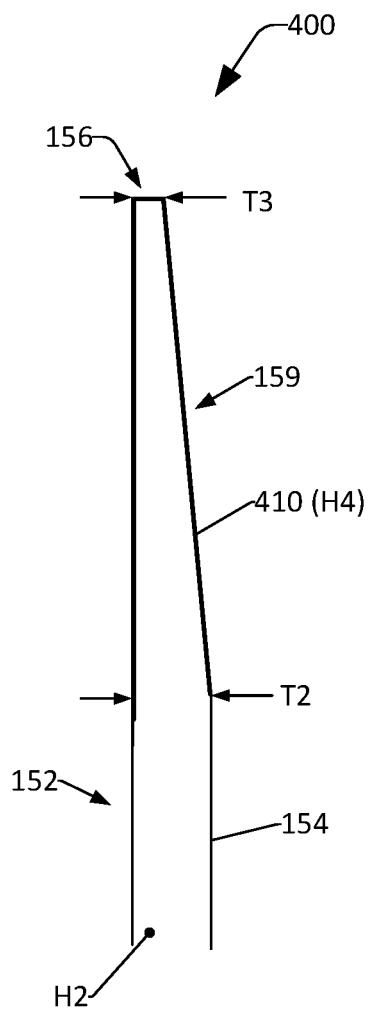
FIG. 4 is an exemplary schematic of a hardened leading edge of a blade wing.

As previously mentioned, a nitriding process can be utilized to harden the blade wings 120-150. Nitriding refers to a heat treating process wherein nitrogen is diffused into the surface of a material to create a hardened surface. Various types of nitriding can be used to harden the blade, including but not limited to: gas nitriding, salt bath nitriding, plasma nitriding (which is also referred to as ion nitriding, plasma ion nitriding or glow-discharge nitriding), etc. With more specificity, the blade 100 can be placed in a vacuum vessel, where a high-voltage electrical charge forms plasma, causing nitrogen ions to accelerate and impinge on the blade 100, and in particular the leading edge 156 regions. The nitriding process causes interaction of nitrogen ions in the process environment to interact with titanium at the surface of the blade 100 to form titanium nitride (TiN), wherein the TiN layer has a higher hardness than the underlying unreacted titanium. The TiN layer can be of any suitable thickness, e.g., a few microns thick. FIG. 4, blade configuration 400, illustrates a leading edge 156 of a blade wing 400, wherein a TiN layer 410 has been formed at the surface of a blade wing. The TiN layer 410 has a hardness H4 while the underlying titanium material has a hardness of H2, where H4>H2. As the TiN layer 410 is essentially formed by diffusion of nitrogen into the titanium surface layer, the thickness of the blade 400 remains unchanged, such that T3=T1 (as shown in FIG. 3).

To vary the hardness across the blade 100, a mask (not shown) can be utilized, wherein mask material and thickness can be selected based upon an amount of nitrogen desirably absorbed by the mask. For instance, for regions of the blade 100 where less hardness is desired (e.g., the central portion 100), a mask can be applied thereto, wherein the mask limits or prevents diffusion of at least some of the nitrogen ions that would otherwise be absorbed by the titanium and/or titanium alloy forming the blade 100. For regions of the blade 100 where maximum hardness is desired (e.g., regions of the leading edge 156), no mask is applied to such regions.

In an embodiment, a combination of different hardening processes can be utilized to achieve the one or more hardness values desired across the blade 100. For example, a leading edge 156 (and proximate regions 152, 154, and/or 159) can undergo a work hardening operation (e.g., coining) to achieve a hardness H1 having a desired hardness compared to a hardness for the body 110 of the blade 100, and the leading edge 156 having the hardness H1 can undergo further hardening, such as a nitriding process. Hence, the work hardening operation can impart a degree of hardening to the surface of the leading edge 156 and the nitriding can be utilized to form a hardened layer of a few microns thickness.

Figure 5:
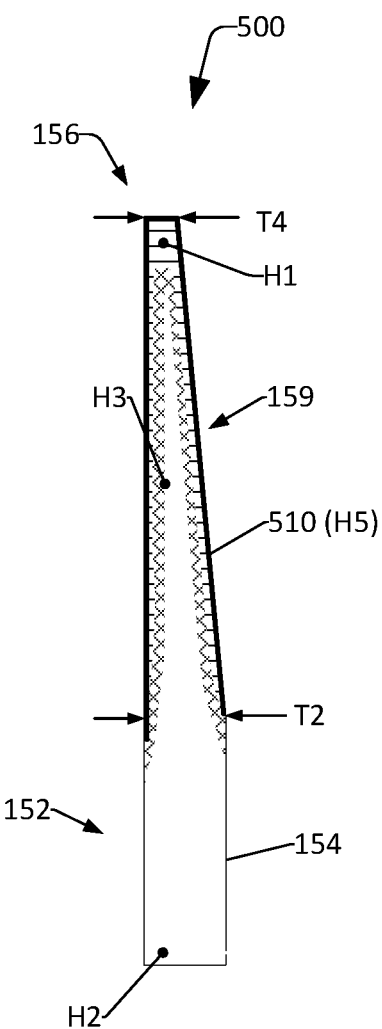
FIG. 5 is an exemplary schematic of a hardened leading edge of a blade wing.

FIG. 5, blade edge configuration 500, illustrates a leading edge 156 of a blade wing, wherein a TiN layer 510 has been formed at the surface of a blade wing which has previously undergone a work hardening operation to a hardness of H1 (as previously described with reference to FIGS. 1-3). Hence, the TiN layer 510 has a hardness H5, where H5=H1, H5<H1, or H5>H1. As the TiN layer 510 is essentially formed by diffusion of nitrogen into the titanium surface layer, the thickness of the blade 500 remains unchanged, such that T4=T1 (as shown in FIG. 3).

Subsequent to being hardened, the blender blade can be subjected to an electropolishing procedure to remove discoloration that may be caused by the hardening of the blender blade. For example, nitriding may cause a surface of the blade 100 to appear gold; performing an electropolishing procedure can cause the blade 100 to appear silver.

Figure 6:
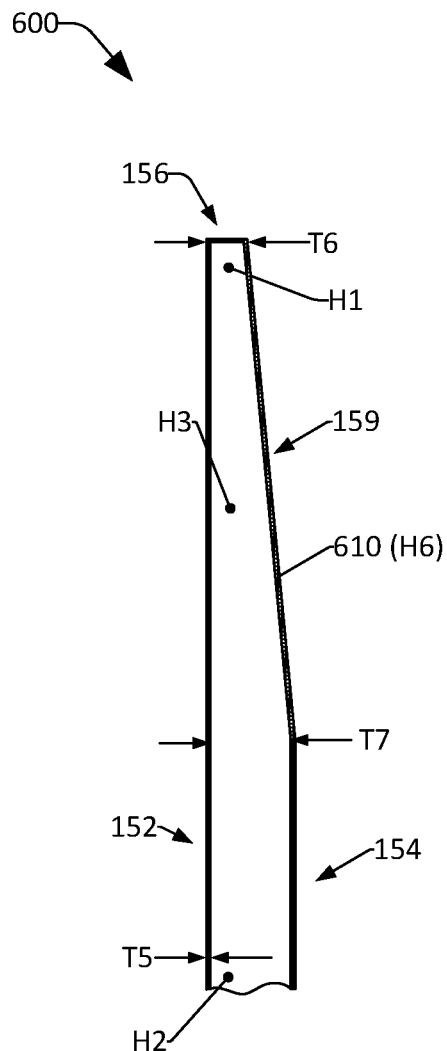
FIG. 6 is an exemplary schematic of a hardened leading edge of a blade wing.

As previously mentioned, a surface layer can be deposited on the leading edge region 156. As illustrated in FIG. 6, blade edge configuration 600, a layer 610 can be deposited upon the leading edge region 150 (and across the whole blade 100) to form a layer having a hardness H6. The blade edge configuration 600 can form a blade wing (e.g., any of blade wings 120, 130, 140, 150) extending from a central portion 110, wherein the blade 100 is formed from material having a constant hardness (e.g., H2) throughout. Hence, the hardness H6 of layer 610 can be greater than the hardness H2 of the underlying titanium material forming the central region 110 and any of the blade wings 120, 130, 140, and 150. The layer 610 has a thickness T5 such that the thickness T6 of the leading edge 156 is greater than the thickness T1 of the uncoated blade 100 shown in FIG. 3 (and T7>T2). Accordingly, to achieve a blade configuration 600 having a leading edge 156 having a thickness T6=T1, the initial thickness T1 should be sized such that the deposition of layer 610 causes thickness T6 of configuration 600 to be the same as the thickness T1 of configuration 200.

Figure 7:
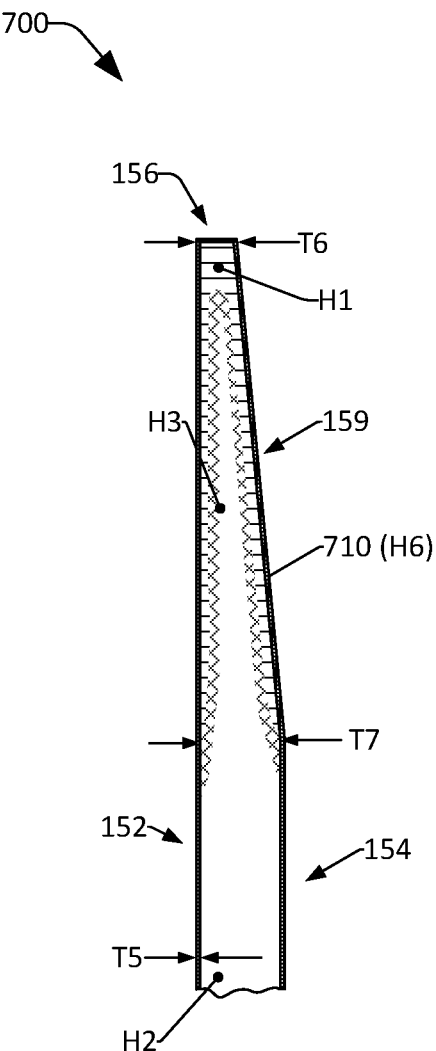
FIG. 7 is an exemplary schematic of a hardened leading edge of a blade wing.

A surface layer can also be deposited on the leading edge region 156 which has already undergone work hardening. As illustrated in FIG. 7, blade edge configuration 700, a layer 710 can be deposited upon the leading edge region 150 (and across the whole blade 100) to form a layer having a hardness H6, wherein H6=H1, H6<H1, or H6>H1. The layer 610 has a thickness T5 such that the thickness T6 of the leading edge 156 is greater than the thickness T1 of the uncoated blade 100 shown in FIG. 3 (and T7>T2). Accordingly, to achieve a blade configuration 700 having a leading edge 156 having a thickness T6=T1, the initial thickness T1 is sized such that the deposition of layer 710 causes thickness T6 of configuration 600 to be the same as the thickness T1 of configuration 200.

Figure 8:
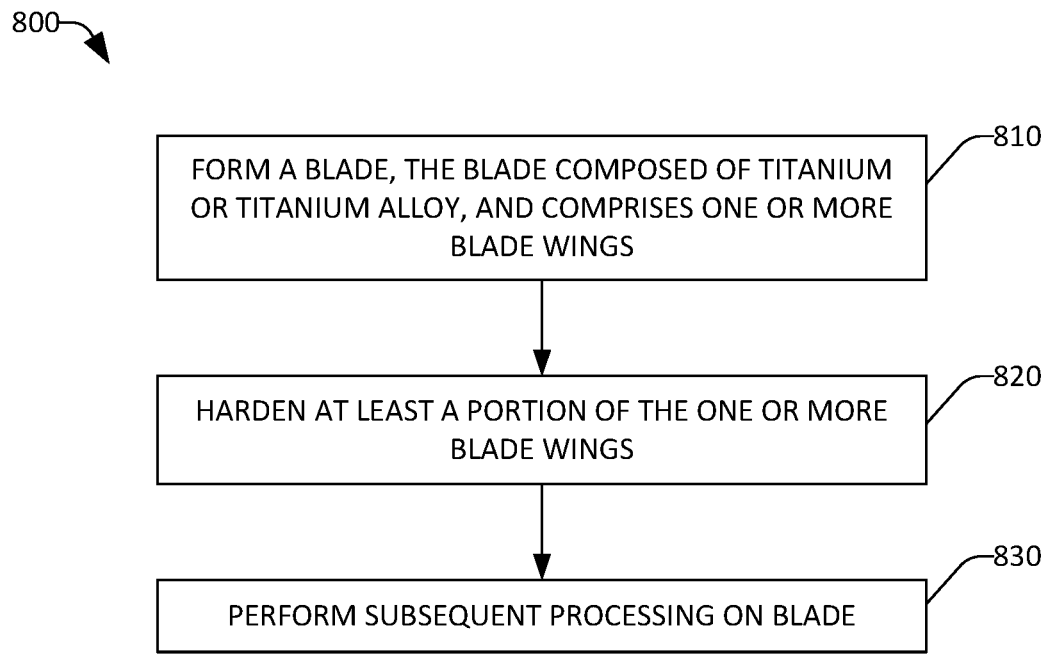
FIG. 8 is a flow diagram illustrating an exemplary methodology for forming a blade with a work hardened region.
Figure 9:
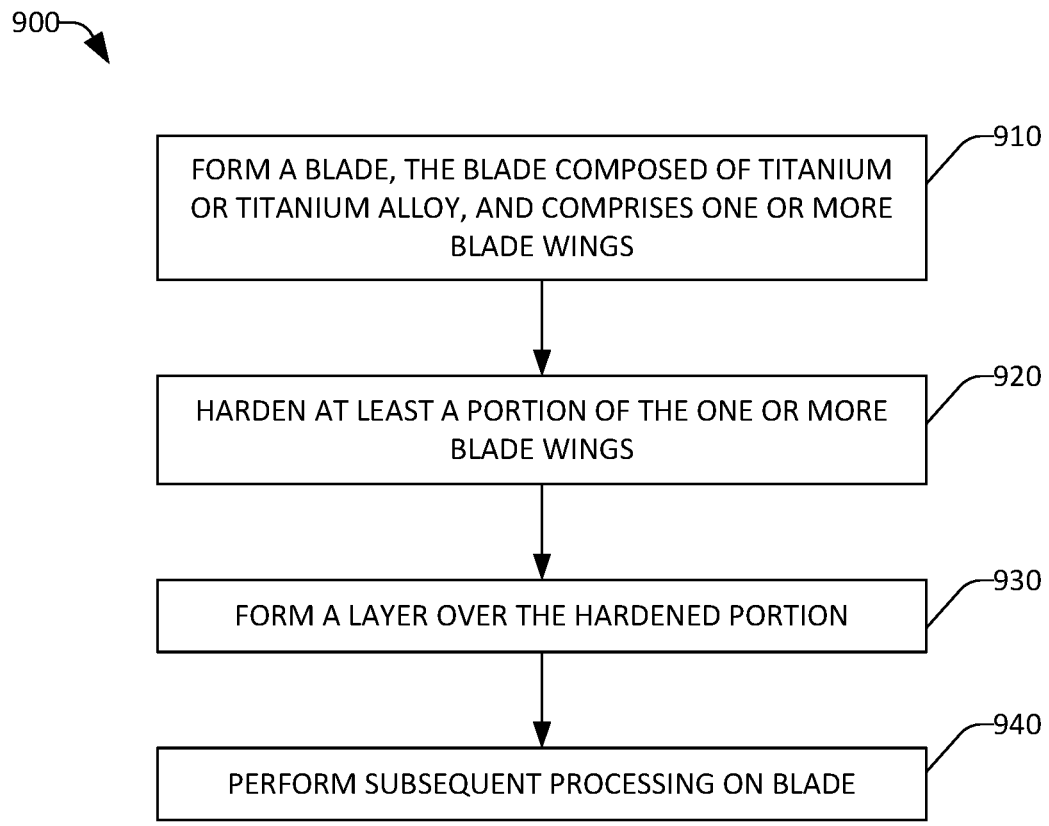
FIG. 9 is a flow diagram illustrating an exemplary methodology for forming a blade with a work hardened region and a layer comprising hard material.

FIGS. 8 and 9 illustrate exemplary methodologies relating to forming a blade. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

FIG. 8 presents an exemplary methodology 800 for forming and hardening a blade. At 810 a blade is formed, wherein the blade can be formed (e.g., entirely) from titanium or a titanium alloy. As previously mentioned, the blade can be formed by stamping out a blank from a sheet of material, casting, near-netshape forming, machining, etc. The blade can comprise a central portion and one or more blade wings, wherein each blade wing in the one or more blade wings can include a leading edge portion and a trailing edge portion. In an as-stamped condition, the blank can be in an annealed condition, and has a first hardness. The central portion can have an aperture formed therein, to enable attachment of the blade to a shaft, or other locating component, for utilization of the blade in a blender. The aperture can be formed as part of the stamping operation or as a subsequent process performed on the stamped blank. Further, the blank can undergo a shaping operation to enable the respective blade wings in the one or more blades to have a desired alignment with respect to an initial plane of the blank. Furthermore, the blank can undergo any necessary material removal (e.g., machining) to enable shaping of the one or more blade wings as desired, e.g., to form a knife edge profile at the leading edge portion.

At 820, the leading edge portions of the blade wing(s) can undergo hardening. Hardening, as previously described, can include work hardening, nitriding, material deposition, etc. In an embodiment, the leading edge portions can undergo work hardening by coining, or some other suitable process. Work hardening results in material of the leading edge portions having a second hardness, wherein the second hardness is higher than the first hardness. In an exemplary embodiment, the first hardness can be in a range of about 25 HRC to about 30 HRC and the second hardness can be in a range of about 40 HRC to about 50 HRC.

At 830, any suitable subsequent processing can be performed. For example, the blade can undergo an aesthetic operation, such as polishing. Further, a material removal operation can be performed, such as electro-chemical machining (ECM), wherein the hardened leading edge portions can be machined to a desired profile. Other example hardness values are presented above for the first hardness and the second hardness.

FIG. 9 presents an exemplary methodology 900 for forming and hardening a blade. At 910, as previously described, a blade can be formed, wherein the blade comprises a central portion (having an aperture formed therein) and one or more blade wings, wherein each blade wing in the one or more blade wings can include a leading edge portion and a trailing edge portion. The blade can be formed from titanium or a titanium alloy, such that the titanium or titanium alloy extends throughout the cross section of the blade. The blade can be in an annealed condition, and has a first hardness. Each blade can undergo a shaping operation to enable the respective blade wings in the one or more blades to have a desired alignment with respect an initial plane of the blank. Furthermore, the blank can undergo any suitable material removal (e.g., machining) to enable shaping of the one or more blade wings.

At 920, the leading edge portions of the blade wing(s) can undergo hardening. In an embodiment, the leading edge portions can undergo work hardening by coining, or other suitable process. Work hardening results in material comprising the leading edge portions having a second hardness, wherein the second hardness is higher than the first hardness. In an exemplary embodiment, the first hardness can be in a range of about 25 HRC to about 30 HRC and the second hardness can be in a range of about 40 HRC to about 50 HRC.

At 930, a hardened layer can be formed at or over the hardened leading edge portions. In an exemplary embodiment, the hardened layer can be formed by nitriding the hardened leading edge portions therein forming a TiN layer at the surface of the hardened leading edge portions. The TiN has a third hardness, wherein the third hardness can be equal to, less than, or greater than the second hardness. In an aspect, the TiN layer can be applied for aesthetic reasons, wherein advantage is made of the gold coloration of the TiN layer versus the silver coloration of the underlying titanium. In another embodiment, the hardened layer can be formed by deposition of a hard layer over the hardened leading edge portions. Similarly, the deposited layer can have a fourth hardness, wherein the can be equal to, less than, or greater than the second hardness.

At 940, any suitable subsequent processing can be performed. For example, the blade can undergo an aesthetic operation, such as polishing. Further, a material removal operation can be performed, such as electro-chemical machining (ECM), wherein the TiN layer or the deposited layer can be machined to a final desired profile.

Figure 10:
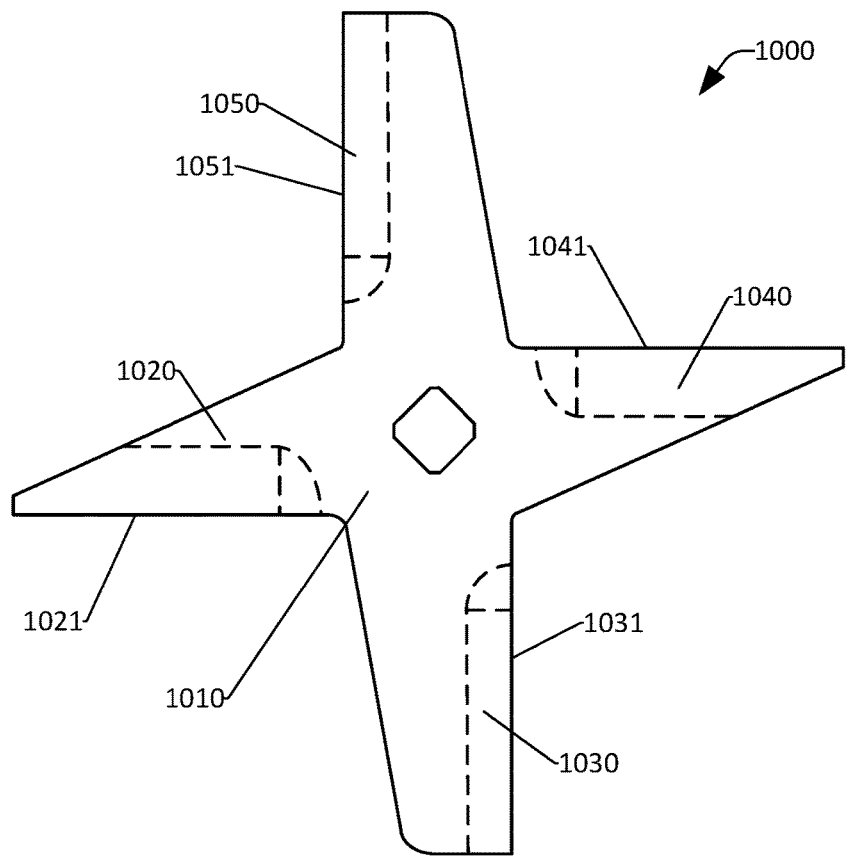
FIGS. 10 and 11 are exemplary drawings of a blade configuration comprising four blade wings.
Figure 11:
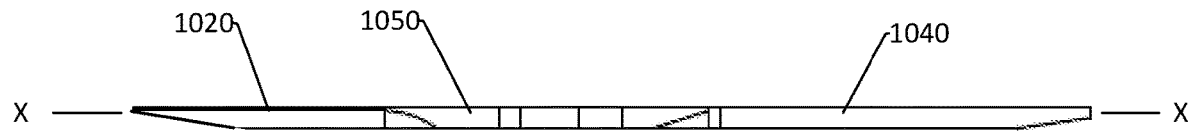

As previously mentioned, a blade formed with any of numerous configurations can be fabricated utilizing one or more processes described herein. While a first blade configuration is presented in FIGS. 1-3, FIGS. 10-17 present a number of other configurations for which the various embodiments presented herein are applicable. FIGS. 10 and 11 illustrate a configuration 1000, wherein the blade 1000 comprises a central planar portion 1010 and four blade wings 1020, 1030, 1040, and 1050. The four blade wings 1020, 1030, 1040, and 1050 have respective leading edges 1021, 1031, 1041, and 1051. As shown in FIG. 11, the blade 1000 has a flat planar profile across its entirety, with blade wings 1020, 1030, and 1040 (blade wing 1050 is hidden) all aligned in the plane X-X. The respective profiles of blade wings 1020 and 1040 are paired and further the profiles of blade wings 1030 and 1050 are the same.

Figure 12:
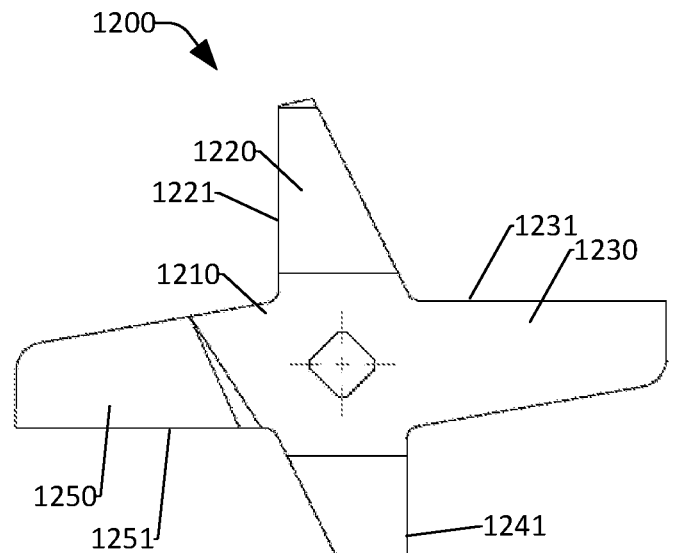
FIGS. 12-14 are exemplary drawings of a blade configuration comprising four blade wings.
Figure 14:
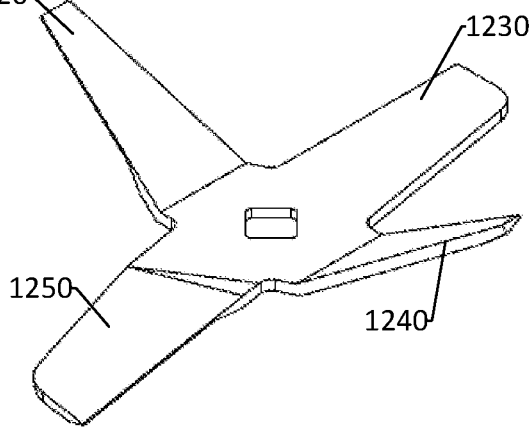
Figure 13:
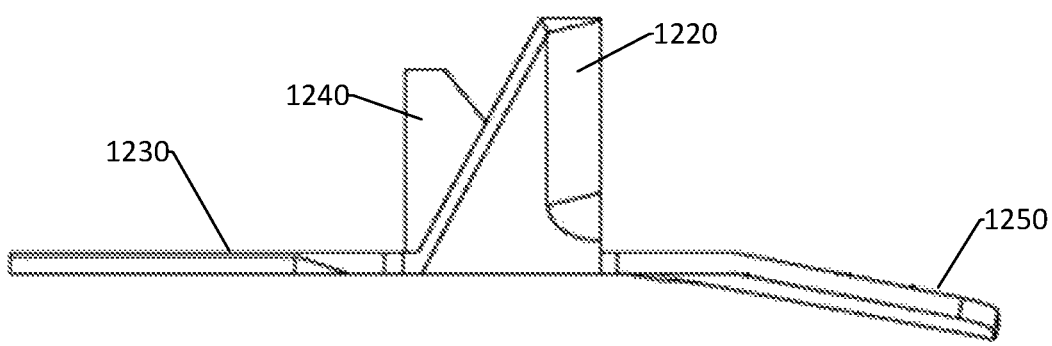

FIGS. 12-14 illustrate a configuration 1200, wherein the blade 1200 comprises a central planar portion 1210 and four blade wings 1220, 1230, 1240, and 1250. The four blade wings 1220, 1230, 1240, and 1250 have respective leading edges 1221, 1231, 1241, and 1251. As shown in FIGS. 13 and 14, the blade wing 1230 is coplanar with the central portion 1210, blade wings 1220 and 1240 are upwardly aligned, and blade wing 1250 is downwardly aligned. Blade wings 1220 and 1240 have similar profiles, and the profiles of blade wings 1230 and 1250 are similar although aligned in opposite directions.

Figure 15:
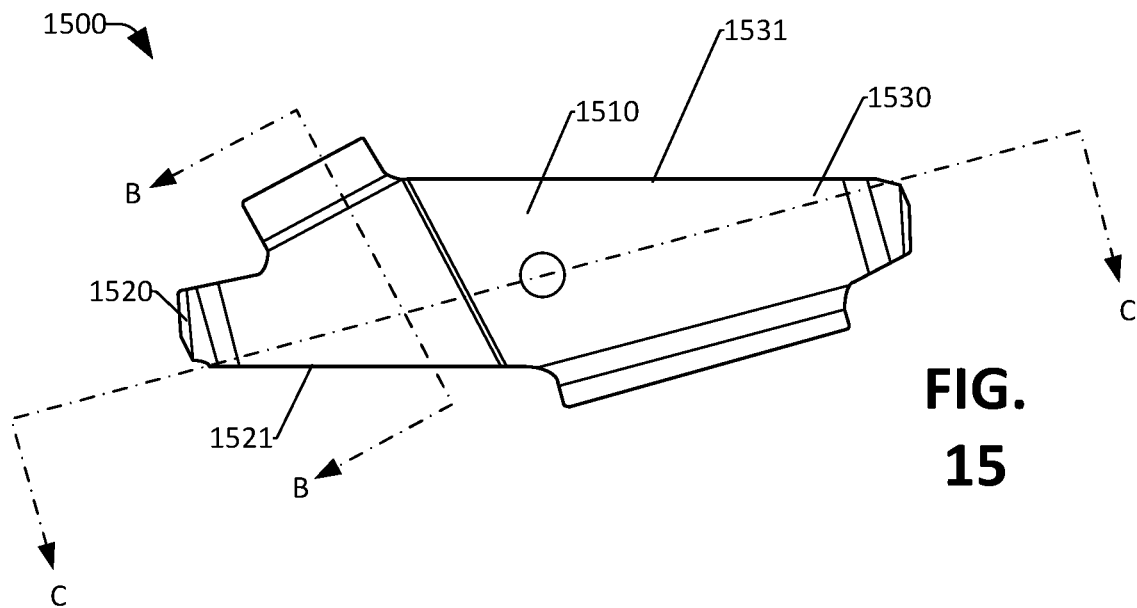
FIGS. 15-17 are exemplary drawings of a blade configuration comprising two blade wings.
Figure 16:
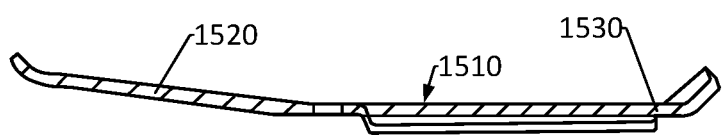
Figure 17:
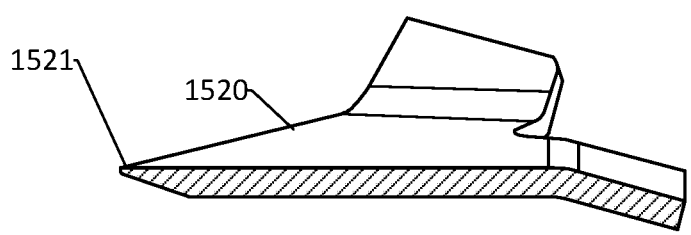

FIGS. 15-17 illustrate a configuration 1500, wherein the blade 1500 comprises a central planar portion 1510 and two blade wings 1520 and 1530 having dissimilar profiles. FIG. 16 is a section view along C-C, and FIG. 17 is a section along B-B. The two blade wings 1520 and 1530 have respective leading edges 1521 and 1531. Blade wing 1220 is upwardly aligned, and blade wing 1230 is aligned coplanar with the central planar portion 1510.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A blender, comprising:
   a rotatable shaft that includes a threaded end;
   a blender blade that is configured to slice foodstuff placed into the blender as the rotatable shaft rotates about an axis, wherein the blender blade comprises:
      a central body portion that is coupled to the threaded end of the rotatable shaft via an aperture of the central body portion and a fastener, wherein the aperture is configured to fit the threaded end of the rotatable shaft, wherein the central body portion is formed entirely of titanium or a titanium alloy and the central body portion includes a first upper surface and a first lower surface; and
      at least one blade wing that extends from the central body portion in a direction,
   wherein the central body portion and the at least one blade wing rotate about the axis when the rotatable shaft rotates about the axis due to the central body portion being coupled to the threaded end of the rotatable shaft via the aperture of the central body portion and the fastener,
   wherein the at least one blade wing is formed entirely of titanium or the titanium alloy and the at least one blade wing has a second upper surface, a second lower surface, and a first thickness therebetween,
   wherein the at least one blade wing is nitrided subsequent to being formed, thereby causing the second upper surface of the at least one blade wing to be covered with a layer of titanium nitride, thereby forming a nitrided surface of the at least one blade wing such that the at least one blade wing has a second thickness between the nitrided surface and the second lower surface that is greater than the first thickness and such that the nitrided surface is coplanar with the first upper surface, thereby forming a common upper surface of the central body portion and the at least one blade wing.

2. The blender of claim 1, wherein the blender blade is formed from a single piece of titanium or the titanium alloy, the central body portion and the at least one blade wing having the common upper surface and a common lower surface, the at least one blade wing further comprising:
   a leading edge between the common upper surface and the common lower surface; and
   a trailing edge between the common upper surface and the common lower surface, the leading edge and the trailing edge are on opposite sides of the blade wing.

3. The blender of claim 2, wherein the at least one blade wing further comprises a beveled surface between the leading edge and the common lower surface.

4. The blender of claim 2, wherein the blender blade has a uniform hardness throughout the central body portion and the at least one blade wing.

5. The blender of claim 4, the uniform hardness being between 25 HRC and 80 HRC on a Rockwell hardness scale.

6. The blender of claim 2, wherein the central body portion has a first hardness, wherein the at least one blade wing has a second hardness, the first hardness being different than the second hardness.

7. The blender of claim 6, wherein the second hardness is derived from work hardening the leading edge.

8. The blender of claim 7, wherein the first hardness is in a range of 30 HRC to 35 HRC on a Rockwell hardness scale, and the second hardness is in a range of 40 HRC to 50 HRC on the Rockwell hardness scale.

9. The blender of claim 7, wherein the surface of the at least one blade wing and the surface of the central body portion are nitrided by one or more of:

gas nitriding;
salt bath nitriding; or
plasma nitriding.

10. The blender of claim 6, wherein the second hardness is sufficient for the blender blade to slice foodstuff placed into the blender, wherein the foodstuff is at a temperature in a range of −30° F. to −50° F. when the foodstuff is sliced by the blender blade.

11. A method for forming a blender that is configured to slice foodstuff placed in the blender, the method comprising:
   providing a blender blade, wherein the blender blade comprises:
      a central body portion having a first upper surface, a first lower surface, and an aperture, wherein the central body portion is formed entirely of titanium or a titanium alloy; and
      a blade wing that extends from the central body portion in a direction, wherein the blade wing is formed entirely of titanium or the titanium alloy and the blade wing has a second upper surface, a second lower surface, and a first thickness therebetween, wherein the blade wing is nitrided subsequent to being formed, thereby covering the second upper surface of the blade wing with a layer of titanium nitride, thereby forming a nitrided surface of the blade wing such that the blade wing has a second thickness between the nitrided surface and the second lower surface that is greater than the first thickness and such that the nitrided surface is coplanar with the first upper surface, thereby forming a common upper surface of the central body portion and the blade wing;
   providing a rotatable shaft that has a threaded end; and
   coupling, with a fastener, the aperture of the central body portion of the blender blade to the threaded end of the rotatable shaft, wherein when the rotatable shaft rotates about an axis, the blender blade is configured to slice the foodstuff placed in the blender due to the aperture of the central body portion of the blender blade being coupled to the threaded of the rotatable shaft.

12. The method of claim 11, wherein the central body portion and the blade wing have the common upper surface and a common lower surface, the blade wing further comprising:
   a leading edge between the common upper surface and the common lower surface; and
   a trailing edge between the common upper surface and the common lower surface, the leading edge and the trailing edge are on opposite sides of the blade wing.

13. The method of claim 12, wherein the blade wing further comprises a beveled surface between the leading edge and the common lower surface.

14. The method of claim 12, further comprising work hardening material of the leading edge of the blade wing.

15. The method of claim 14, wherein the work hardening causes the leading edge to have a first hardness, the first hardness being greater than a second hardness of the central body portion.

16. The method of claim 15, wherein the first hardness is in a range of 40 HRC to 50 HRC on a Rockwell hardness scale, and the second hardness is in a range of 20 HRC to 30 HRC on the Rockwell hardness scale.

17. The method of claim 11, further comprising electropolishing the blender blade.

18. The method of claim 11, the blender blade further comprising:
   a second blade wing that extends from the central body portion in a second direction, wherein the second blade wing is formed entirely of the titanium or the titanium alloy, wherein the second blade wing is covered with the layer of titanium nitride.

19. A blender that comprises:
   a rotatable shaft that includes a threaded end;
   a blender blade that is configured to slice foodstuff placed into the blender as the rotatable shaft rotates about an axis, wherein the blender blade comprises:
      a central body portion that is coupled to the threaded end of the rotatable shaft via an aperture of the central body portion and a fastener, wherein the central body portion is formed entirely of titanium or a titanium alloy and the central body portion includes a first upper surface and a first lower surface;
      a first blade wing that extends from the central body portion in a first direction, wherein the first blade wing is formed entirely of titanium or the titanium alloy and the first blade wing has a second upper surface, a second lower surface, and a first thickness therebetween; and
      a second blade wing that extends from the central body portion in a second direction, wherein the second blade wing is formed entirely of titanium or the titanium alloy and the second blade wing has a third upper surface, a third lower surface, and a second thickness therebetween,
      wherein the second upper surface of the first blade wing and the third upper surface of the second blade wing-are nitrided subsequent to the first blade wing and the second blade wing being formed, thereby covering the second upper surface and the third upper surface with a layer of titanium nitride, thereby forming a first nitrided surface of the first blade wing and a second nitrided surface of the second blade wing such that the first blade wing has a third thickness between the first nitrided surface and the second lower surface that is greater than the first thickness and such that the first nitrided surface is coplanar with the first upper surface, thereby forming a common upper surface of the central body portion and the first blade wing.

20. The blender of claim 19, wherein the central body portion, the first blade wing, and the second blade wing of the blender blade are formed from a single sheet of titanium or titanium alloy.

* * * * *